(12) United States Patent
Reisacher et al.

(10) Patent No.: US 7,318,864 B2
(45) Date of Patent: *Jan. 15, 2008

(54) PIGMENT PREPARATIONS

(75) Inventors: Hansulrich Reisacher, Maxdorf (DE); Juan Antonio Gonzalez Gomez, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 173 days.

This patent is subject to a terminal disclaimer.

(21) Appl. No.: 10/501,343

(22) PCT Filed: Jan. 30, 2003

(86) PCT No.: PCT/EP03/00921

§ 371 (c)(1),
(2), (4) Date: Jul. 26, 2004

(87) PCT Pub. No.: WO03/066743

PCT Pub. Date: Aug. 14, 2003

(65) Prior Publication Data

US 2005/0080171 A1    Apr. 14, 2005

(30) Foreign Application Priority Data

Feb. 4, 2002   (DE)   ................ 102 04 583
Jun. 24, 2002  (DE)   ................ 102 28 199

(51) Int. Cl.
C08K 5/00      (2006.01)
C08K 5/41      (2006.01)
C09D 11/00     (2006.01)
C04B 14/00     (2006.01)
C11C 3/00      (2006.01)
C08G 18/77     (2006.01)

(52) U.S. Cl. ................. 106/499; 106/31.6; 106/31.89; 106/400; 106/503; 106/504; 523/160; 524/115; 524/155

(58) Field of Classification Search .......... 106/31.6, 106/31.89, 400, 499, 503–504; 523/160; 524/115, 155
See application file for complete search history.

(56) References Cited

U.S. PATENT DOCUMENTS

| 4,002,593 | A | * | 1/1977 | Jones ................ 523/318 |
| 4,056,402 | A |   | 11/1977 | Guzi, Jr. |
| 4,127,422 | A |   | 11/1978 | Guzi, Jr. et al. |
| 4,155,773 | A | * | 5/1979 | Ferrill, Jr. ............ 106/413 |
| 4,456,485 | A |   | 6/1984 | Iyengar et al. |
| 4,464,203 | A | * | 8/1984 | Belde et al. ........... 106/413 |
| 5,082,498 | A | * | 1/1992 | Kurtz et al. ........... 106/499 |
| 5,282,898 | A |   | 2/1994 | Wu |
| 5,294,664 | A | * | 3/1994 | Morrison et al. ........ 524/560 |
| 5,585,189 | A | * | 12/1996 | Inoue et al. ........... 428/461 |
| 6,110,266 | A | * | 8/2000 | Gonzalez-Blanco et al. ........... 106/31.65 |
| 6,436,178 | B1 | * | 8/2002 | Hosmer ............... 106/31.46 |
| 6,646,023 | B1 | * | 11/2003 | Nyssen ................ 523/122 |
| 2005/0080171 | A1 |   | 4/2005 | Reisacher et al. |
| 2005/0090609 | A1 |   | 4/2005 | Reisacher et al. |
| 2005/0235876 | A1 |   | 10/2005 | Reisacher et al. |

FOREIGN PATENT DOCUMENTS

| DE | 198 01 759 | 7/1999 |
| DE | 199 05 269 | 8/2000 |
| EP | 084 645 | 8/1983 |
| EP | 403 917 | 12/1990 |
| JP | 51-088523 | 8/1976 |
| JP | 6-345566 | 12/1994 |
| WO | 01/93677 | 12/2001 |

OTHER PUBLICATIONS

U.S. Appl. No. 10/534,298, filed May 9, 2005, Klopp et al.

* cited by examiner

Primary Examiner—J. A. Lorengo
Assistant Examiner—Patricia L. Hailey
(74) Attorney, Agent, or Firm—Oblon, Spivak, McClelland, Maier & Neustadt, P.C.

(57) ABSTRACT

Pigment preparations including as essential constituents
  (A) from 60 to 90% by weight of at least one pigment,
  (B) from 10 to 40% by weight of at least one nonionic surface-active additive based on polyethers, and
  (C) from 0.1 to 10% by weight of at least one anionic surface-active additive based on sulfonates, sulfates, phoshonates or phosphates,
the sum total of the weight percentages not exceeding 100% by weight,
are prepared and used for pigmenting macromoleular organic and inorganic materials.

12 Claims, No Drawings

PIGMENT PREPARATIONS

The present invention relates to novel pigment preparations including as essential constituents
(A) from 60 to 90% by weight of at least one pigment,
(B) from 10 to 40% by weight of at least one nonionic surface-active additive based on polyethers, and
(C) from 0.1 to 10% by weight of at least one anionic surface-active additive based on sulfonates, sulfates, phosphonates or phosphates, the sum total of the weight percentages not exceeding 100% by weight.

The invention also relates to the production of these pigment preparations and to their use for pigmenting macromolecular organic and inorganic materials.

Liquid systems such as coatings, varnishes, emulsion paints and printing inks are customarily colored using pigment formulations which include water, organic solvent or mixtures thereof. As well as anionic, cationic, nonionic or amphoteric dispersants, these pigments formulations generally have to be additized with further assistants, such as dried-crust inhibitors, freeze resistance enhancers, thickeners and anti-skinners, for stabilization.

There is a need for novel pigment preparations which are comparable to the liquid formulations with regard to color properties and dispersibility, but do not require the additions mentioned and are easier to handle. However, simply drying the liquid formulations does not provide solid pigment preparations having comparable application properties.

U.S. Pat. No. 4,056,402 and U.S. Pat. No. 4,127,422 describe dry nondusting pigment compositions for waterborne finish systems. However, these pigment compositions, as well as nonionic dispersants, include as an essential constituent at least 10% by weight of water-soluble cellulose ethers or of water-dispersible polyvinyl compounds and hence differ from the pigment preparations of the present invention.

EP-A-84 645 and EP-A-403 917 disclose highly concentrated, solid pigment formulations for coloring aqueous, alcoholic and aqueous/alcoholic coatings and printing inks that include up to 30% by weight of an additive based on reaction products of at least bifunctional amines with propylene oxide and ethylene oxide, but no anionic additive.

DE-A-199 05 269 describes solid pigment formulations which include only nonionic dispersants or <8% by weight of mixtures of nonionic and anionic dispersants and always, as an additional essential constituent, a thickener based on optionally partially hydrogenated polyvinyl alcohol or on anionic polyhydroxy compounds.

It is an object of the present invention to provide solid pigment preparations having altogether advantageous application properties, in particular high color strength and particularly good stir-in dispersibility in a wide variety of application media.

We have found that this object is achieved by pigment preparations including as essential constituents
(A) from 60 to 90% by weight of at least one pigment,
(B) from 10 to 40% by weight of at least one nonionic surface-active additive based on polyethers, and
(C) from 0.1 to 10% by weight of at least one anionic surface-active additive based on sulfonates, sulfates, phosphonates or phosphates, the sum total of the weight percentages not exceeding 100% by weight.

The present invention further provides a process for preparing the pigment preparations, which comprises wet-comminuting the pigment (A) in aqueous suspension in the presence of some or all of additive (B) and in the presence or absence of additive (C), subsequently adding additive (C) if the wet-comminuting was carried out in its absence, and then drying the suspension, if necessary after the rest of additive (B) has been added.

The present invention yet further provides a process for pigmenting macromolecular organic and inorganic materials, which comprises incorporating pigment preparations into these materials by stirring or shaking.

The pigment preparations of the present invention include as essential constituents a pigment (A), a nonionic surface-active additive (B) and an anionic surface-active additive (C).

Component (A) in the pigment preparations of the present invention may be an organic pigment or an inorganic pigment. It will be appreciated that the pigment preparations may also include mixtures of various organic or various inorganic pigments or mixtures of organic and inorganic pigments.

The pigments are present in finely divided form. Accordingly the pigments typically have average particle sizes from 0.1 to 5 µm.

The organic pigments are typically organic chromatic and black pigments. Inorganic pigments can likewise be color pigments (chromatic, black and white pigments) and also luster pigments and the inorganic pigments typically used as fillers.

There now follow examples of suitable organic color pigments:
monoazo pigments: C.I. Pigment Brown 25;
  C.I. Pigment Orange 5, 13, 36, 38, 64 and 67;
  C.I. Pigment Red 1, 2, 3, 4, 5, 8, 9, 12, 17, 22, 23, 31, 48:1, 48:2, 48:3, 48:4, 49, 49:1, 51:1, 52:1, 52:2, 53, 53:1, 53:3, 57:1, 58:2, 58:4, 63, 112, 146, 148, 170, 175, 184, 185, 187, 191:1, 208, 210, 245, 247 and 251;
  C.I. Pigment Yellow 1, 3, 62, 65, 73, 74, 97, 120, 151, 154, 168, 181, 183 and 191;
  C.I. Pigment Violet 32;
disazo pigments: C.I. Pigment Orange 16, 34, 44 and 72;
  C.I. Pigment Yellow 12, 13, 14, 16, 17, 81, 83, 106, 113, 126, 127, 155, 174, 176, 180 and 188;
disazo condensation pigments: C.I. Pigment Yellow 93, 95 and 128;
  C.I. Pigment Red 144, 166, 214, 220, 221, 242 and 262;
  C.I. Pigment Brown 23 and 41;
anthanthrone pigments: C.I. Pigment Red 168;
anthraquinone pigments: C.I. Pigment Yellow 147, 177 and 199;
  C.I. Pigment Violet 31;
anthrapyrimidine pigments: C.I. Pigment Yellow 108;
quinacridone pigments: C.I. Pigment Orange 48 and 49;
  C.I. Pigment Red 122, 202, 206 and 209;
  C.I. Pigment Violet 19;
quinophthalone pigments: C.I. Pigment Yellow 138;
diketopyrrolopyrrole pigments: C.I. Pigment Orange 71, 73 and 81;
  C.I. Pigment Red 254, 255, 264, 270 and 272;
dioxazine pigments: C.I. Pigment Violet 23 and 37;
  C.I. Pigment Blue 80;
flavanthrone pigments: C.I. Pigment Yellow 24;
indanthrone pigments: C.I. Pigment Blue 60 and 64;
isoindoline pigments: C.I. Pigments Orange 61 and 69;
  C.I. Pigment Red 260;
  C.I. Pigment Yellow 139 and 185;

isoindolinone pigments: C.I. Pigment Yellow 109, 110 and 173;
isoviolanthrone pigments: C.I. Pigment Violet 31;
metal complex pigments: C.I. Pigment Red 257;
  C.I. Pigment Yellow 117, 129, 150, 153 and 177;
  C.I. Pigment Green 8;
perinone pigments: C.I. Pigment Orange 43;
  C.I. Pigment Red 194;
perylene pigments: C.I. Pigment Black 31 and 32;
  C.I. Pigment Red 123, 149, 178, 179, 190 and 224;
  C.I. Pigment Violet 29;
phthalocyanine pigments: C.I. Pigment Blue 15, 15:1, 15:2, 15:3, 15:4, 15:6 and 16;
  C.I. Pigment Green 7 and 36;
pyranthrone pigments: C.I. Pigment Orange 51;
  C.I. Pigment Red 216;
pyrazoloquinazolone pigments: C.I. Pigment Orange 67;
  C.I. Pigment Red 251;
thioindigo pigments: C.I. Pigment Red 88 and 181;
  C.I. Pigment Violet 38;
triarylcarbonium pigments: C.I. Pigment Blue 1, 61 and 62;
  C.I. Pigment Green 1;
  C.I. Pigment Red 81, 81:1 and 169;
  C.I. Pigment Violet 1, 2, 3 and 27;
C.I. Pigment Black 1 (aniline black);
C.I. Pigment Yellow 101 (aldazine yellow);
C.I. Pigment Brown 22.
Examples of suitable inorganic color pigments are:
white pigments: titanium dioxide (C.I. Pigment White 6), zinc white, pigment grade zinc oxide;
  zinc sulfide, lithopone;
black pigments: iron oxide black (C.I. Pigment Black 11), iron manganese black, spinel black (C.I. Pigment Black 27); carbon black (C.I. Pigment Black 7);
chromatic pigments: chromium oxide, chromium oxide hydrate green; chrome green (C.I. Pigment Green 48); cobalt green (C.I. Pigment Green 50); ultramarine green;
  cobalt blue (C.I. Pigment Blue 28 and 36; C.I. Pigment Blue 72); ultramarine blue; manganese blue;
  ultramarine violet; cobalt violet; manganese violet;
  red iron oxide (C.I. Pigment Red 101); cadmium sulfoselenide (C.I. Pigment Red 108); cerium sulfide (C.I. Pigment Red 265); molybdate red (C.I. Pigment Red 104); ultramarine red;
  brown iron oxide (C.I. Pigment Brown 6 and 7), mixed brown, spinel phases and corundum phases (C.I. Pigment Brown 29, 31, 33, 34, 35, 37, 39 and 40), chromium titanium yellow (C.I. Pigment Brown 24), chrome orange;
  cerium sulfide (C.I. Pigment Orange 75); yellow iron oxide (C.I. Pigment Yellow 42); nickel titanium yellow (C.I. Pigment Yellow 53; C.I. Pigment Yellow 157, 158, 159, 160, 161, 162, 163, 164 and 189); chromium titanium yellow; spinel phases (C.I. Pigment Yellow 119); cadmium sulfide and cadmium zinc sulfide (C.I. Pigment Yellow 37 and 35); chrome yellow (C.I. Pigment Yellow 34); bismuth vanadate (C.I. Pigment Yellow 184).
Examples of inorganic pigments typically used as fillers are transparent silicon dioxide, ground quartz, aluminum oxide, aluminum hydroxide, natural micas, natural and precipitated chalk and barium sulfate.
Luster pigments are platelet-shaped pigments having a monophasic or polyphasic construction whose color play is marked by the interplay of interference, reflection and absorption phenomena. Examples are aluminum platelets and aluminum, iron oxide and mica platelets bearing one or more coats, especially of metal oxides.

Component (B) in the pigment preparations of the present invention is at least one nonionic surface-active additive based on polyethers.

The polyethers are in particular polyalkylene oxides or reaction products of alkylene oxides with alcohols, amines, aliphatic carboxylic acids or aliphatic carboxamides. For the purposes of the present invention, the term "alkylene oxide" shall also comprehend aryl-substituted alkylene oxide, especially phenyl-substituted ethylene oxide.

As well as unmixed polyalkylene oxides, preferably $C_2$-$C_4$-alkylene oxides and phenyl-substituted $C_2$-$C_4$-alkylene oxides, especially polyethylene oxides, polypropylene oxides and poly(phenylethylene oxide)s, it is in particular alkylene oxide block copolymers, but also random copolymers of these alkylene oxides which are useful as component (B).

Of very particular suitability here are block copolymers having polypropylene oxide and polyethylene oxide blocks or else poly(phenylethylene oxide) and polyethylene oxide blocks. They, like the unmixed polyalkylene oxides, are obtainable by polyaddition of the alkylene oxides to starter compounds, such as to saturated or unsaturated aliphatic and aromatic alcohols, to saturated or unsaturated aliphatic and aromatic amines and to saturated or unsaturated aliphatic carboxylic acids and carboxamides. When ethylene oxide and propylene oxide are used, these starter compounds can be reacted first with ethylene oxide and then with propylene oxide or preferably first with propylene oxide and then with ethylene oxide. It is customary to use from 1 to 300 mol and preferably from 3 to 150 mol of alkylene oxide per mole of starter molecule.

Suitable aliphatic alcohols contain in general from 6 to 26 carbon atoms and preferably from 8 to 18 carbon atoms and can have an unbranched, branched or cyclic structure. Examples are octanol, nonanol, decanol, isodecanol, undecanol, dodecanol, 2-butyloctanol, tridecanol, isotridecanol, tetradecanol, pentadecanol, hexadecanol, 2-hexyldecanol, heptadecanol, octadecanol, 2-heptylundecanol, 2-octyldecanol, 2-nonyltridecanol, 2-decyltetradecanol, oleyl alcohol and 9-octadecenol and also mixtures of these alcohols, such as $C_8$/$C_{10}$, $C_{13}$/$C_{15}$ and $C_{16}$/$C_{18}$ alcohols, and cyclopentanol and cyclohexanol. Of particular interest are the saturated and unsaturated fatty alcohols obtained from natural raw materials by fat hydrolysis and reduction and the synthetic fatty alcohols from the oxo process. The alkylene oxide adducts with these alcohols typically have average molecular weights $M_n$ from 200 to 5000, in particular from 400 to 2000.

Examples of the abovementioned aromatic alcohols include not only α- and β-naphthol and their $C_1$-$C_4$-alkyl derivatives but also in particular phenol and its $C_1$-$C_{12}$-alkyl derivatives, such as hexylphenol, heptylphenol, octylphenol, nonylphenol, isononylphenol, undecylphenol, dodecylphenol, di- and tributylphenol and dinonylphenol.

Suitable aliphatic amines correspond to the above-mentioned aliphatic alcohols. Again of particular importance here are the saturated and unsaturated fatty amines which preferably have from 14 to 20 carbon atoms. Examples of suitable aromatic amines are aniline and its derivatives.

Useful aliphatic carboxylic acids include especially saturated and unsaturated fatty acids which preferably contain from 14 to 20 carbon atoms and fully hydrogenated, partially hydrogenated and unhydrogenated resin acids and also polyfunctional carboxylic acids, for example dicarboxylic acids, such as maleic acid.

Suitable carboxamides are derived from these carboxylic acids.

As well as the alkylene oxide adducts with these monofunctional amines and alcohols it is the alkylene oxide adducts with at least bifunctional amines and alcohols which are of very particular interest.

The at least bifunctional amines preferably have from two to five amine groups and conform in particular to the formula $H_2N-(R-NR^1)_n-H$ (R: $C_2$-$C_6$-alkylene; $R^1$: hydrogen or $C_1$-$C_6$-alkyl; n: 1-5). Specific examples are: ethylenediamine, diethylenetriamine, triethylenetetramine, tetraethylenepentamine, 1,3-propylene-diamine, dipropylenetriamine, 3-amino-1-ethyleneaminopropane, hexamethylenediamine, dihexamethylenetriamine, 1,6-bis(3-aminopropylamino)hexane and N-methyldipropylenetriamine, of which hexamethylenediamine and diethylenetriamine are more preferable and ethylenediamine is most preferable.

These amines are preferably reacted first with propylene oxide and then with ethylene oxide. The ethylene oxide content of the block copolymers is typically about 10-90% by weight.

The block copolymers based on polyamines generally have average molecular weights $M_n$ from 1000 to 40000 and preferably from 1500 to 30000.

The at least bifunctional alcohols preferably have from two to five hydroxyl groups. Examples are $C_2$-$C_6$-alkylene glycols and the corresponding di- and polyalkylene glycols, such as ethylene glycol, 1,2-propylene glycol, 1,3-propylene glycol, 1,2-butylene glycol, 1,4-butylene glycol, 1,6-hexylene glycol, dipropylene glycol and polyethylene glycol, glycerol and pentaerythritol, of which ethylene glycol and polyethylene glycol are more preferable and propylene glycol and dipropylene glycol are most preferable.

Particularly preferred alkylene oxide adducts with at least bifunctional alcohols have a central polypropylene oxide block, ie are based on a propylene glycol or polypropylene glycol which is initially reacted with further propylene oxide and then with ethylene oxide. The ethylene oxide content of the block copolymers is typically in the range from 10 to 90% by weight.

The block copolymers based on polyhydric alcohols generally have average molecular weights $M_n$ from 1000 to 20000 and preferably from 1000 to 15000.

Such alkylene oxide block copolymers are known and commercially available, for example under the names Tetronic® and Pluronic® (BASF).

Alkylene oxide block copolymers (B) are selected with different hydrophilic-lipophilic balance (HLB) values, depending on the application medium in which the pigment preparations of the present invention are to be used.

For use in aqueous, aqueous/alcoholic and alcoholic systems, preference is given to alkylene oxide block copolymers (B) having HLB values of about $\geq 10$, which corresponds to an ethylene oxide content of the copolymers of generally $\geq 25\%$ by weight.

For use of the pigment granules of the present invention in hydrocarbonaceous, eg mineral oil containing or xylenic systems or systems based on nitrocellulose, alkylene oxide block copolymers (B) having HLB values of about <10 are particularly suitable, this HLB value corresponding to an ethylene oxide content of the copolymers of generally <25% by weight.

Component (C) in the pigment preparations of the present invention is at least one anionic surface-active additive based on sulfonates, sulfates, phosphonates or phosphates.

Examples of suitable sulfonates are aromatic sulfonates, such as p-$C_8$-$C_{20}$-alkylbenzenesulfonates, di($C_1$-$C_8$-alkyl) naphthalene-sulfonates and condensation products of naphthalenesulfonic acids with formaldehyde, and aliphatic sulfonates, such as $C_{12}$-$C_{18}$-alkyl sulfonates, $C_2$-$C_8$-alkyl esters of α-sulfo fatty acid, sulfosuccinic esters and alkoxy-, acyloxy- and acylaminoalkanesulfonates.

Preference is given to aryl sulfonates, of which di($C_1$-$C_8$-alkyl)naphthalenesulfonates are particularly preferred. Diisobutyl- and diisopropylnaphthalenesulfonate are most preferred.

Examples of suitable sulfates are $C_8$-$C_{20}$-alkyl sulfates.

A further important group of anionic additives (C) is that of the sulfonates, sulfates, phosphonates and phosphates of the polyethers mentioned as nonionic additives (B).

Reaction with phosphoric acid, phosphorus pentoxide and phosphonic acid on the one hand or with sulfuric acid and sulfonic acid on the other converts the polyethers into the phosphoric mono- or diesters and phosphonic esters on the one hand and the sulfuric monoesters and sulfonic esters on the other. These acid esters, like the sulfonates and sulfates listed hereinabove, are preferably in the form of water-soluble salts, especially as alkali metal salts, in particular sodium salts, and ammonium salts, but can also be used in the form of the free acids.

Preferred phosphates and phosphonates are derived in particular from alkoxylated and especially ethoxylated fatty and oxo process alcohols, alkylphenols, fatty amines, fatty acids and resin acids, while preferred sulfates and sulfonates are based in particular on alkoxylated and especially ethoxylated fatty alcohols, alkylphenols and amines, including polyfunctional amines such as hexamethylenediamine.

Such anionic surface-active additives are known and commercially available for example under the names of Nekal® (BASF), Tamol® (BASF), Crodafos® (Croda), Rhodafac® (Rhodia), Maphos® (BASF), Texapon® (Cognis), Empicol® (Albright & Wilson), Matexil® (ICI), Soprophor® (Rhodia) and Lutensit® (BASF).

The pigment preparations of the present invention include from 60 to 90% by weight and preferably from 70 to 85% by weight of component (A), from 10 to 40% by weight and preferably from 10 to 30% by weight of component (B) and from 0.1 to 10% by weight and especially from 0.2 to 5% by weight of component (C).

They are advantageously obtainable by the process of the invention by wet-comminuting the pigment (A) in aqueous suspension in the presence of some or all of nonionic additive (B) and in the presence or absence of additive (C), subsequently adding additive (C) if the wet-comminuting was carried out in its absence, and then drying the suspension, if necessary after the rest of additive (B) has been added.

Pigment (A) can be used in the process of the present invention as a dry powder or in the form of a presscake.

Pigment (A) as used is preferably a finished product, ie the primary particle size of the pigment has already been adjusted to the desired application value. This finish is recommended in the case of organic pigments especially, since the as-synthesized crude material is not usually directly suitable for use. In the case of inorganic pigments, for example in the case of oxide and bismuth vanadate pigments, the primary particle size may also be adjusted in the course of the synthesis of the pigment, so that the as-synthesized pigment suspensions can be used direct in the process of the present invention.

Since the finished pigment (A) typically reagglomerates in the course of drying or on the filter assembly, it is subjected to wet comminution, for example grinding in a stirred media mill, in aqueous suspension.

The wet comminution should be carried out in the presence of at least a portion of the additive (B) for the ready-produced pigment preparation, and it is preferable to add the entire amount of additive (B) prior to the wet comminution.

Additive (C) can be added before, during or after the wet comminution.

The particle size of the pigment preparations of the present invention can be controlled in a specific manner, depending on the chosen method of drying—spray granulation and fluidized bed drying, spray drying, drying in a paddle dryer, evaporation and subsequent comminution.

Spray and fluidized bed granulation may produce coarsely divided granules having average particle sizes from 50 to 5000 µm and especially from 100 to 1000 µm. Spray drying typically produces granules having average particle sizes <20 µm. Finely divided preparations are obtainable by drying in a paddle dryer and by evaporation with subsequent grinding. However, the pigment preparations of the present invention are preferably in granule form.

Spray granulation is preferably carried out in a spray tower using a one-material nozzle. Here, the suspension is sprayed in the form of relatively large drops, and the water evaporates. Additives (B) and (C) melt at the drying temperatures and so lead to the formation of a substantially spherical granule having a particularly smooth surface (BET values generally $\leq 15$ m$^2$/g, especially $\leq 10$ m$^2$/g).

The gas inlet temperature in the spray tower is generally in the range from 180 to 300° C. and preferably in the range from 150 to 300° C. The gas outlet temperature is generally in the range from 70 to 150° C. and preferably in the range from 70 to 130° C.

The residual moisture content of the granular pigment obtained is generally <2% by weight.

The pigment preparations of the present invention are notable in use for their excellent color properties which are comparable to those of liquid pigment formulations, especially with regard to color strength, brilliance, hue and hiding power, and especially for their stir-in characteristics, ie they can be dispersed in application media with a minimal input of energy, simply by stirring or shaking. This applies in particular to the coarsely divided pigment granules, which constitute the preferred embodiment of the pigment preparations of the present invention.

Compared with liquid pigment formulations, the pigment preparations of the present invention additionally have the following advantages: They have a higher pigment content. Whereas liquid formulations tend to change viscosity in the course of storage, and have to be admixed with preservatives and agents for enhancing the resistance to freezing and/or drying out (crusting), the pigment preparations of the present invention exhibit very good stability in storage. They are both economically and ecologically advantageous with regard to packaging, storage and transportation. Since they are solvent free, they are more flexible in use.

The pigment preparations of the present invention which are in granule form are notable for excellent attrition resistance, a minimal tendency to compact or clump, uniform particle size distribution, good pourability, flowability and meterability, and also dustlessness in handling and application.

The pigment preparations of the present invention are very useful for pigmenting macromolecular organic and inorganic materials of any kind. Liquid application media in this context can be purely aqueous, comprise mixtures of water and organic solvents, for example alcohols, or be based exclusively on organic solvents, such as alcohols, glycol ethers, ketones, eg methyl ethyl ketone, amides, eg N-methylpyrrolidone and dimethylformamide, esters, eg ethyl acetate, butyl acetate and methoxypropyl acetate, or aromatic or aliphatic hydrocarbons, eg xylene, mineral oil and mineral spirits.

When the HLB value of the additive (B) included in the pigment preparations of the present invention has not been adapted to the character of the application medium, as described above, the preparations can initially be stirred into a solvent which is compatible with the particular application medium, and this stirring into the solvent is again possible with minimal input of energy, and then be introduced into this application medium. For instance, slurries of pigment preparations having high HLB values in glycols or other solvents customary in the paint and coatings industry, such as methoxypropyl acetate, can be used to render the pigment preparations compatible with hydrocarbonaceous systems or systems based on nitrocellulose.

Examples of materials which can be pigmented with the pigment preparations of the present invention include: coatings, for example architectural coatings, industrial coatings, automotive coatings, radiation-curable coatings; paints, including paints for building exteriors and building interiors, for example wood paints, lime washes, distempers, emulsion paints; solventborne printing inks, for example offset printing inks, flexographic printing inks, toluene intaglio printing inks, textile printing inks, radiation-curable printing inks; waterborne inks, including inkjet inks; color filters; building materials (water is typically added only after building material and pigment preparation have been dry mixed), for example silicate render systems, cement, concrete, mortar, gipsum; bitumen, caulks; cellulosic materials, for example paper, paperboard, cardboard, wood and woodbase, which can each be coated or otherwise finished; adhesives; film-forming polymeric protective colloids as used for example in the pharmaceutical industry; cosmetic articles; detergents.

The pigment preparations of the present invention are particularly useful as mixing components in color-mixing or -matching systems. Owing to their stir-in characteristics, they can be used directly as a solid for this purpose. If desired, however, they can also be first converted into base colors, mixing varnishes and tinting colors (especially into colors having a high solids content, "HS colors"), or even more highly pigmented tinting pastes which then constitute the components of the mixing system. The matching of the desired hue and hence the mixing of the color components can be effected visually via a system of color cards in a very large number of hue gradations which are based on color standards, such as RAL, BS and NCS, or preferably under computer control, whereby an unlimited number of hues become accessible ("computer color matching").

EXAMPLES

Production and Testing of Granular Pigment Preparations According to Invention

Examples 1 to 13

The pigment granules were produced by ball milling a suspension of 19 kg of additive (B) and 80 kg of finished pigment (A) in 120 kg of water to a $d_{50}$ value of 0.8 µm, adding 1 kg of additive (C1) (diisobutylnaphthalenesulfonic acid, sodium salt) and spray granulating the mixture in a spray tower using a one-material nozzle (gas inlet temperature 170° C., gas outlet temperature 80° C.).

Examples 14 to 17

The pigment granules were produced by a suspension of x kg of finished pigment (A), y kg of additive (B3) and z kg of additive (C2) in 150 kg of water being adjusted to pH 7 by addition of 25% by weight aqueous sodium hydroxide solution, ball milled to a $d_{50}$ value of <1 µm, and then spray granulated in a spray tower using a one-material nozzle at a gas inlet temperature of 165° C. and a gas outlet temperature of 70° C.

The color strength of the pigment granules was determined colorimetrically in the white reduction (reported in terms of the DIN 55986 coloring equivalents (CE)) in a waterborne emulsion paint. To this end, a mixture of in each case 1.25 g of granular pigment and 50 g of a waterborne styrene-acrylate-based test binder having a white pigment content of 16.4% by weight ($TiO_2$, Kronos 2043) (BASF test binder 00-1067) were homogenized in a 150 ml plastic beaker by running a high speed stirrer at 1500 rpm for 3 min. The color obtained was then drawn down on a black and white test card using a 100 µm wire-wound film applicator and dried for 30 min.

The corresponding emulsion paints produced using commercially available aqueous formulations of the inks were assigned the CE value of 100 standard. CE values <100 mean a higher color strength than that of the standard, CE values >100 accordingly a lower color strength.

Tables 1 and 2 list details of the pigment granules produced and also the respectively obtained CE values. The additives (B) and (C) used were as follows:

B1: block copolymer based on ethylenediamine/propylene oxide/ethylene oxide, having an ethylene oxide content of 40% by weight and an average molecular weight $M_n$ of 12000

B2: block copolymer based on ethylenediamine/propylene oxide/ethylene oxide, having an ethylene oxide content of 40% by weight and an average molecular weight $M_n$ of 6700

B3: propylene oxide/ethylene oxide block copolymer having a central polypropylene oxide block, an ethylene oxide content of 50% by weight and an average molecular weight $M_n$ of 6500

C1: Diisobutylnaphthalenesulfonic acid, sodium salt

C2: Acid phosphoric ester based on ethoxylated $C_8$-$C_{10}$ oxo process alcohol (6 mol of EO/mol of alcohol)

TABLE 1

| Ex. | Pigment (A) | Additive (B) | $d_{50}$ [µm] | BET [m²/g] | CE |
|---|---|---|---|---|---|
| 1 | C.I. P. Y. 42 | B1 | 310 | 5 | 88 |
| 2 | C.I. P. Y. 74 | B1 | 290 | 3 | 100 |
| 3 | C.I. P. Y. 138 | B1 | 290 | 1 | 102 |
| 4 | C.I. P. Y. 184 | B1 | 320 | 1 | 103 |
| 5 | C.I. P. R. 101 | B1 | 310 | 3 | 100 |
| 6 | C.I. P. R. 112 | B1 | 330 | 1 | 98 |
| 7 | C.I. P. R. 122 | B1 | 290 | 1 | 100 |
| 8 | C.I. P. V. 19 | B1 | 260 | 2 | 88 |
| 9 | C.I. P. V. 23 | B1 | 280 | 1 | 96 |
| 10 | C.I. P. B. 15:2 | B1 | 290 | 2 | 100 |
| 11 | C.I. P. B. 15:3 | B2 | 310 | 6 | 97 |
| 12 | C.I. P. G. 7 | B1 | 280 | 1 | 100 |
| 13 | C.I. P. Bk. 7 | B1 | 300 | 4 | 100 |

TABLE 2

| | Pigment | Additive (B3) | Additive (C2) | |
|---|---|---|---|---|
| Ex. | (A) | x kg | y kg | z kg | CE |
| 14 | C.I. P. Y. 74 | 75 | 20 | 5 | 100 |
| 15 | C.I. P. Y. 138 | 75 | 20 | 5 | 99 |
| 16 | c.I. P. B. 15:3 | 80 | 16 | 4 | 97 |
| 17 | C.I. P. Bk. 7 | 75 | 20 | 5 | 98 |

We claim:

1. A solid pigment preparation including as essential constituents
   (A) from 60 to <90% by weight of at least one pigment,
   (B) from 10 to <40% by weight of at least one nonionic surface-active additive based on polyethers, and
   (C) from 0.1 to 10% by weight of at least one anionic surface-active additive based on sulfonates, sulfates, phosphonates or phosphates,
   the sum total of the weight percentages not exceeding 100% by weight.

2. Pigment preparation as claimed in claim 1, wherein component (B) comprises alkylene oxide block copolymers.

3. Pigment preparation as claimed in claim 1, wherein component (B) comprises alkylene oxide adducts with at least bifunctional amines or alcohols.

4. Pigment preparation as claimed in claim 1, wherein component (C) comprises arylsulfonates and/or ether sulfates.

5. Pigment preparation as claimed in claim 1, wherein component (C) comprises ether phosphates.

6. Pigment preparation as claimed in claim 1, in the form of granules having an average particle size from 50 to 5000 µm and a BET surface area of ≦15 m²/g.

7. A process for producing a pigment preparation as claimed in claim 1, which comprises wet-comminuting the pigment (A) in aqueous suspension in the presence of some or all of additive (B) and in the presence or absence of additive (C), subsequently adding additive (C) if the wet-comminuting was carried out in its absence, and then drying the suspension, if necessary after the rest of additive (B) has been added.

8. A process for pigmenting macromolecular organic or inorganic materials, which comprises incorporating a pigment preparation as claimed in claim 1 into these materials by stirring or shaking.

9. A process as claimed in claim 8, wherein said macromolecular organic or inorganic materials are pigmenting coatings, paints, inks, or finish systems, where a liquid phase comprises water, organic solvent or mixtures of water and organic solvent.

10. A process for pigmenting macromolecular organic or inorganic materials using color-mixing systems, which comprises incorporating a pigment preparation as claimed in claim 1 as mixing components.

11. Pigment preparation as claimed in claim 6, wherein the average particle size is from 100 to 1,000 µm and the BET surface area is ≦10 m²/g.

12. Pigment preparation as claimed in claim 1, wherein component (A) is present in an amount of from 60 to 85% by weight, component (B) is present in an amount of from 10 to 30% by weight, and component (C) is present in an amount of 0.2 to 10% by weight.

* * * * *